No. 885,189. PATENTED APR. 21, 1908.
V. H. SLINACK.
HYDROCARBON INCANDESCENT LIGHT.
APPLICATION FILED APR. 5, 1906.
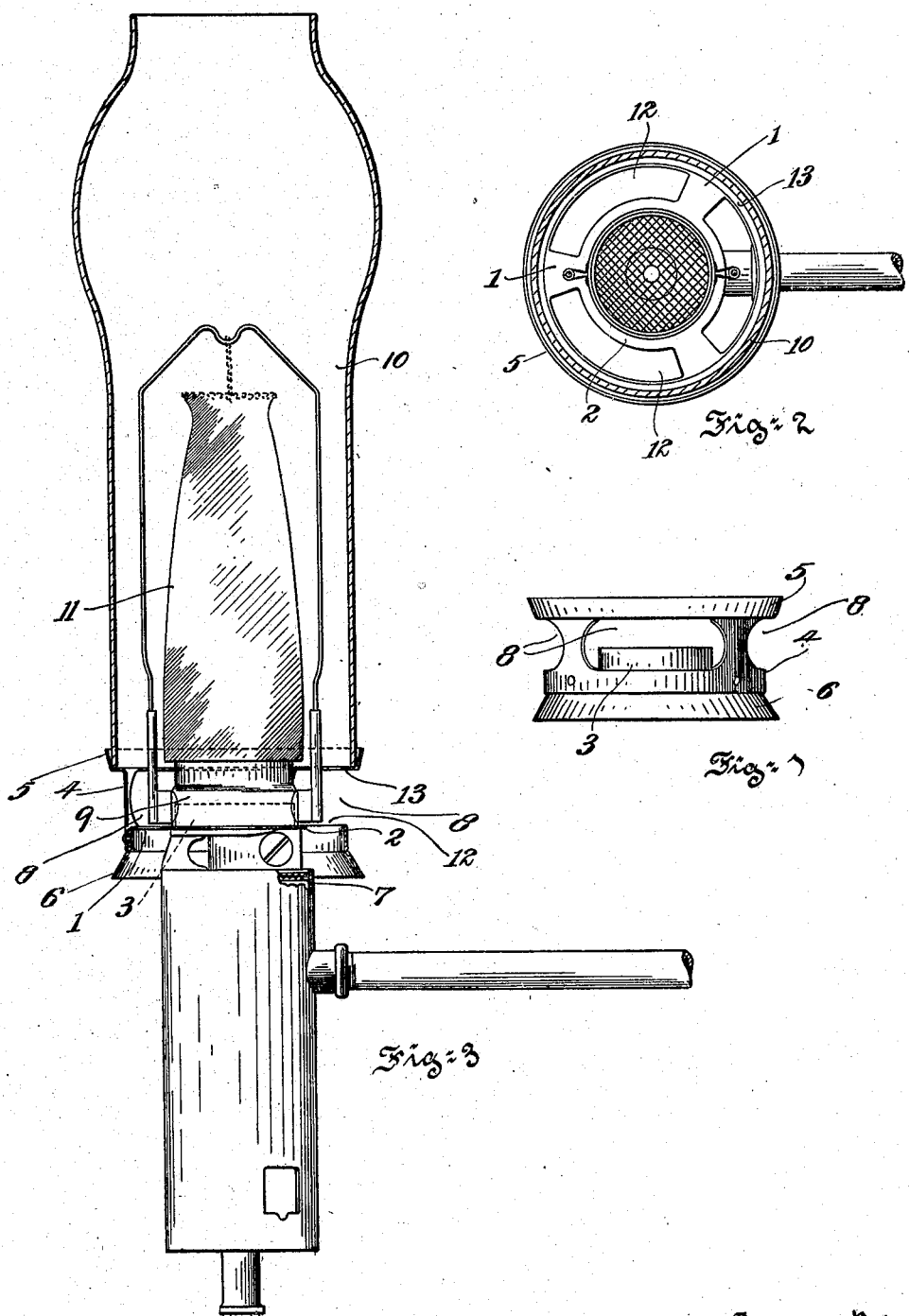

UNITED STATES PATENT OFFICE.

VICTOR H. SLINACK, OF PHILADELPHIA, PENNSYLVANIA, ASSIGNOR TO PENNSYLVANIA GLOBE GAS LIGHT COMPANY, OF PHILADELPHIA, PENNSYLVANIA, A CORPORATION OF PENNSYLVANIA.

HYDROCARBON INCANDESCENT LIGHT.

No. 885,189.　　　　Specification of Letters Patent.　　Patented April 21, 1908.

Application filed April 5, 1906. Serial No. 310,036.

*To all whom it may concern:*

Be it known that I, VICTOR H. SLINACK, a citizen of the United States, residing at the city of Philadelphia, in the county of Philadelphia and State of Pennsylvania, have invented certain new and useful Improvements in Hydrocarbon Incandescent Lights, of which the following is a specification.

Objects of the present invention are to improve the draft at the main or lighting burner and to insure proper combustion at the sub or heating burners; to protect the glass chimneys from breakage when a torch is applied for lighting the light; to admit an ample supply of air in close proximity with the point of ignition at the lighting burner; to prevent the lighting torch flame from getting under the skirt of the mantle at the burner head; and to provide a simple, comparatively inexpensive and attractive fitting adapted to accomplish the foregoing objects and to also support a glass chimney.

In the drawings Figure 1, is an elevational view of a fitting embodying features of the invention. Fig. 2, is a top or plan view, partly in section, showing the fitting in application to a burner, and Fig. 3, is an elevational view, partly in section, showing the burner or light equipped with a fitting embodying features of the invention.

The fitting comprises a spider 1, having at its center a horizontal flange 2, and an upright flange 3. Supported at the ends of the arms of the spider there is a cylinder 4, provided at its top rim with a chimney carrier 5, and at its lower rim with a guard 6, for protecting the sub-jets which burn at 7, from drafts. The curved wall of this cylinder is provided with air intakes, slots or openings 8. In use the spider is placed over the burner head and the flange 3, encircles it. The burner cap 9, is placed over the burner head and its skirt overhangs the flange 3. The chimney 10, is arranged in the chimney carrier 5, and the mantle 11, occupies substantially the position shown. The openings 12, between the arms of the spider afford a passage by means of which the sub-jets 7, if accidentally extinguished, may be re-lighted from the main burner. Furthermore when a lighting torch is applied to the burner, its flames may also traverse these openings 12, and thus light the light. The guard 6, by reason of its position, shields the sub-jets from drafts and prevents their accidental extinguishment. The openings 8, by admitting a supply of air close up to the burner head, insure excellent combustion. The horizontal flange 2, prevents currents of air or drafts from the lighting torch from getting under the skirt of the mantle, thus avoiding its breakage. The horizontal portion 13, as well as the rest of the chimney carrier, prevent the hot flame of the lighting torch from impinging directly upon the glass chimney whereby breakage of the latter is obviated.

Having thus described the nature and objects of my invention, what I claim as new and desire to secure by Letters Patent is:

1. A fitting for hydrocarbon incandescent lights comprising a spider having at its center a ring and an upturned cylindrical flange, and a peripherally slotted cylinder carried by the arms of the spider and having at its top rim a chimney carrier and at its bottom rim an imperforate sub-jet guard, substantially as described.

2. A fitting for hydrocarbon incandescent lights comprising a cylinder having a slotted surface and having at its top rim a chimney carrier and at its bottom rim an imperforate sub-jet guard, and a crosswise ranging plate intermediate of said rims and having a central opening and other openings arranged around it, substantially as described.

In testimony whereof I have hereunto signed my name.

VICTOR H. SLINACK.

Witnesses:
　K. M. GILLIGAN,
　FRANK E. FRENCH.